United States Patent Office 3,372,159
Patented Mar. 5, 1968

3,372,159
NOVEL 3-SPIROLACTONE, STEROIDS OF THE ANDROSTANE SERIES AND METHODS OF PRODUCING SAID COMPOUNDS
Oswald Auguste de Bruin, Van Houtenlaan, Weesp, Netherlands, assignor to North American Philips Company, Inc., New York, N.Y., a corporation of Delaware
No Drawing. Filed Nov. 12, 1965, Ser. No. 507,531
Claims priority, application Netherlands, Nov. 14, 1964, 64—13,306
8 Claims. (Cl. 260—239.57)

ABSTRACT OF THE DISCLOSURE

Condense γ bromo cis-crotonic acid esters or β-alkoxy derivatives thereof with 3-keto-androstanes to produce a 3-spirolactone of the androstane series, for example 3-ethoxy-4(5'α-androstane-3'β,17' - diol - 3'-yl-17-acetate)-but-2-ene-acid lactone. The compounds have anti-(endogenic)-estrogenic activities. This abstract is not intended to be a description of the invention defined by the claims.

The invention relates to compounds of the formula:

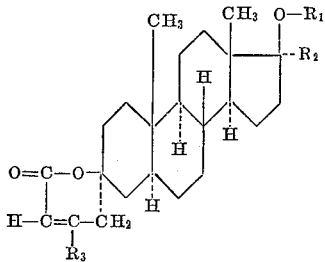

In this formula $R_1$ is a hydrogen atom or an acyl radical of a carboxylic acid having 1 to 20 carbon atoms, for example an aliphatic carboxylic acid such as acetic, acid, propionic acid, butyric acid, valeric acid, oleic acid, caproic acid, succinic acid, citric acid or of an aromatic carboxylic acid such as p-hexyloxy-phenylpropionic acid or benzoic acid, $R_2$ is a hydrogen atom or an alkyl group having 1 to 6 carbon atoms, for example a methyl- or an ethyl-group, $R_3$ is a hydrogen atom or a hydroxyl-group or an alkoxy-group having 1 to 6 carbon atoms, for example an ethoxy- or a methoxy-group.

The compounds according to the invention are conspicuous by their anti-(endogenic)-estrogenic activity.

The compounds according to the invention can be produced by condensing a γ-halogen-cis-crotonic acid ester, which compound may be substituted at the β-position by an alkoxy-group, by the Reformatsky method, with a 3-keto-androstane of the formula:

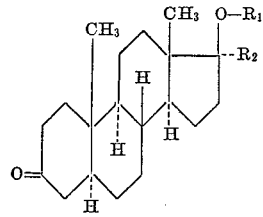

in which formula $O—R_1$ and $R_2$ have the aforesaid meanings.

Compounds in which $R_3$ is a hydroxy-group may be produced by hydrolysing the reaction product of a 3-keto-androstane and a γ-halogen-cis-crotonic acid ester, substituted at the β-position by an alkoxy-group with an acid, particularly formic acid.

The reaction conditions of the Reformatsky method are known. The zinc is preferably brought into the activated form in the manner described in the following examples. The reaction is furthermore preferably carried out in a medium of thiophene-free benzene. The intermediately formed zinc compound may be suitably hydrolysed by adding an acidically reacting aqueous liquid, for example a saturated solution of ammonium chloride in water.

This reaction for the production of spirolactones has not yet been described and it may also be used for the production of other spirolactones, for example, by using as a starting material a 17-keto compound.

The invention is particularly suitable for the production of 3-ethoxy-4-(5'α-androstane-3'β,17'β-diol - 3' - yl-17'-acetate)-but-2-ene-acid lactone from 5α-androstane-17β-ol-3-one 17-acetate and 4-bromo-3-ethoxy-but-2-ene acid ethylester(γ-bromo-β-ethoxy-cis-crotonic acid ethylester). The resultant compound has not only anti-(endogenic)-estrogenic activity but also a lactation-inhibiting effect.

For producing pharmaceutical preparations the conventional methods may be used, as are known for producing dragees, pills, tablets, ointments or injection liquids.

The invention will be described with reference to the following examples.

Example I

Zinc wool was activated by washing it in order of succession with 2 N hydrochloric acid, distilled water, 95% ethanol, acetone, diethylether, anhydrous benzene. Then the zinc was dried in vacuo above a steam bath and used directly.

In a three-neck bulb comprising a cooler and an agitator, 1.13 g. (0.0173 mol) of activated zinc wool was joined to a few crystals of mercuric chloride. From a separating funnel about one quarter of a mixture of 3.927 g. (0.0166 mol) of γ-bromo-β-ethoxy-crotonic acid ethylester and 5 g. (0.015 mol) of 5α-androstane-17β-ol-3-one 17-acetate, dissolved in 19 ml. of dry thiophene-free benzene was added in drops.

The bulb was heated by a small flame until the reaction started, which became evident by the change of color of the liquid. Then, while stirring, the remainder of the solution was added so rapidly that the solution continued boiling. The reaction was continued, while boiling, for 30 minutes, the solution assuming a yellow-green color.

After cooling the reaction product was dissociated by adding 30 ml. saturated, acqueous ammonium chloride and by stirring vigorously for half an hour. Then the mixture was filtered and the water layer was separated off and decanted. The organic solution was subsequently washed with saturated ammonium chloride solution and water, dried on sodium sulphate and inspissated.

After crystallisation from ethanol colorless crystals of 3-ethoxy - 4 - (5'α - indrostane-3'β,17'β-diol - 3 - yl-17'-acetate)-but-2-ene acid lactone was obtained with a yield of 40%.

Physical constants: melting point 201 to 202° C.
$[\alpha]_D^{25} = 0°$ (CHCl$_3$).

$E_{238.5}=11.340$.
Infrared bands: 1736, 1698, 1639, 1229, 1040 and 810 cm.$^{-1}$ (KBr).

*Example II*

Starting with α-bromo-β-ethoxy-crotonic acid ethylester and 17α-methyl-5α-androstane - 17 - ol-3-one 17-acetate there was produced in the same manner 3-ethoxy-4-(17′α-methyl - 5′α-androstane - 3′β,17′-diol-3′-yl-17-acetate)-but-2-ene acid lactone.

Melting point: 160.5 to 161.5° C.
$[α]_D^{25}=0°$ (CHCl$_3$).
$E_{239}=11.420$.

*Example III*

Starting from γ-bromo-β-methoxy-crotonic acid ethylester and 5α-androstane-17β-ol-3-one 17-acetate there was produced in the same manner 3-methoxy-4-(5′α-androstane-3′β,17′β-diol-3′-yl-17′-acetate)-but - 2 - ene acid lactone.

Melting point: 229.5 to 230.5° C.
$E_{237.5}=10.930$.

*Example IV*

3 g. of 3-ethoxy - 4-(5′α-androstane - 3′β,17′β-diol-3′-yl-17′-acetate)-but-2-ene acid lactone was dissolved in 30 ml. of formic acid. The mixture crystallised out during the reaction, which was carried out at room temperature for 95 hours. Then the solution was cooled to 0°, filtered, washed on the filter with cooled diethylether and dried in air. The crude product had a weight of 2.53 g. After crystallisation from methanol and a slight quantity of methylene chloride there was obtained 2.29 g. of 3-hydroxy-4-(5′α-androstane-3′β,17′β-diol - 3′ - yl - 17′-acetate)-but-2-ene acid lactone, having a melting point of 202.5 to 210°, the substance resolidifying at 216° C.; it melted again at 227° C.

Physical constants of an analytically pure quantity:

Melting point 210.5–212° and 227.5–229.5° C.
$[α]_D^{25}=0°$ (CHCl$_3$).
$E_{271}=21.500$ (basic medium) and $E_{242}=10.380$ (acid medium).
Infrared absorption bands: 1250, 1580, 1625, 1650, 1700 cm.$^{-1}$ (KBr).

*Example V*

5 g. of 3-ethoxy - 4-(5′α-androstane-3′β,17′β-diol-3′-yl-17′-acetate)-but-2-ene acid lactone was dissolved in chloroform and this solution was homogeneously mixed with 185 g. of lactose. The mixture was dried at 40° C. for one hour and then wetted with a 10% aqueous solution of 1.5 g. of gelatine and then pressed through a sieve having meshes of 0.84 mm. The mixture was dried at 45° C. for 24 hours and again passed through a sieve having meshes of 0.84 mm. The grains were weighed and proportional quantities of potato starch, talcum and magnesium stearate were added, preferably in quantities of 33.5, 8 and 2 g. respectively. The resultant mixture was homogenised and worked to obtain tablets of 235 mg.

*Example VI*

In 90 ml. of a solution of 2% by weight/volume of benzyl alcohol and 46% by weight/volume of benzylbenzoate in castor oil of a temperature of 60° C. there was dissolved 2.00 g. of 3-methoxy-4-(5′α-androstane-3′β,17′β-diol-3′-yl-17′-acetate)-but-2-ene acid lactone. The solution was cooled to room temperature and completed to 100 ml. with the said solution in castor oil. The mixture was homogenised by stirring and filtered. Ampullae and flasks were filled with the filtered solution, sealed and sterilised by heating at 120° C. for one hour.

What is claimed is:
1. A steroid of the formula:

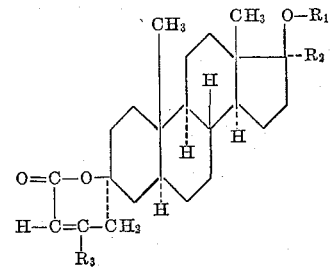

wherein R$_1$ is a member of the group consisting of hydrogen, the acyl radical of an aliphatic carboxylic acid of 1 to 20 carbon atoms inclusive, and the acyl radical of p-hexyloxy-phenylpropionic acid, R$_2$ is a member selected from the group consisting of hydrogen and alkyl of 1 to 6 carbon atoms inclusive and R$_3$ is a member selected from the group consisting of hydrogen, hydroxyl and alkoxy of 1 to 6 carbon atoms inclusive.

2. The steroid of claim 1 wherein

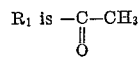

R$_2$ is hydrogen and R$_3$ is ethoxy.

3. The steroid of claim 1 wherein

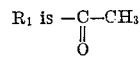

R$_2$ is methyl and R$_3$ is ethoxy.

4. The steroid of claim 1 wherein

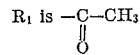

R$_2$ is hydrogen and R$_3$ is methoxy.

5. The steroid of claim 1 wherein

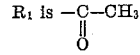

R$_2$ is hydrogen and R$_3$ is hydroxy.

6. A method of producing steroid lactones comprising causing to condense by means of the Reformatsky reaction a γ halogenated cis crotonic acid ester selected from the group consisting of those esters unsubstituted in the β position and those esters substituted with 2 to 6 carbon atoms in the β position with a 3-keto-androstane of the formula

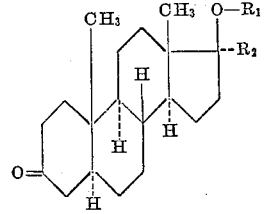

wherein R$_1$ is a member selected from the group consisting of hydrogen and the acyl radical of a carboxylic acid of 1 to 20 carbon atoms inclusive and R$_2$ is a member selected from the group consisting of hydrogen and alkyl of 1 to 6 carbon atoms inclusive.

7. The method of claim 6 wherein the crotonic acid ester is the ethyl ester.

8. The method of claim 7 wherein the crotonic acid ester is γ-bromo-β-ethoxy-cis-crotonic acid ethylester.

References Cited

UNITED STATES PATENTS 2,361,964   11/1944   Ruzicka et al. _____ 260—239.5

LEWIS GOTTS, *Primary Examiner.*

T. M. MESHBESHER, *Assistant Examiner.*

UNITED STATES PATENT OFFICE
CERTIFICATE OF CORRECTION

Patent No. 3,372,159                          March 5, 1968

Oswald Auguste de Bruin

It is certified that error appears in the above identified patent and that said Letters Patent are hereby corrected as shown below:

Column 1, line 42, after "acetic" cancel the comma. Column 2, line 62, "indrostane" should read -- androstane --; same line 62, "-3-" should read -- -3'- --. Column 3, line 9, "17" should read -- 17' --.

Signed and sealed this 20th day of January 1970.

(SEAL)
Attest:

Edward M. Fletcher, Jr.                         WILLIAM E. SCHUYLER, JR.
Attesting Officer                                    Commissioner of Patents